(12) United States Patent
Krogman et al.

(10) Patent No.: US 9,395,475 B2
(45) Date of Patent: Jul. 19, 2016

(54) BROADBAND SOLAR CONTROL FILM

(71) Applicant: Eastman Chemical Company, Kingsport, TN (US)

(72) Inventors: Kevin Krogman, Santa Clara, CA (US); J. Wallace Parce, Palo Alto, CA (US); Siglinde Schmid, San Jose, CA (US); Melissa Fardy, Belmont, CA (US); Tom Hood, Portola Valley, CA (US); Steven D. White, Sunnyvale, CA (US); Benjamin Wang, Mountain View, CA (US)

(73) Assignee: Eastman Chemical Company, Kingsport, TN (US)

( * ) Notice: Subject to any disclaimer, the term of this patent is extended or adjusted under 35 U.S.C. 154(b) by 187 days.

(21) Appl. No.: 14/246,096

(22) Filed: Apr. 5, 2014

(65) Prior Publication Data

US 2014/0218792 A1    Aug. 7, 2014

Related U.S. Application Data

(63) Continuation of application No. PCT/US2012/059142, filed on Oct. 5, 2012.

(60) Provisional application No. 61/544,943, filed on Oct. 7, 2011.

(51) Int. Cl.
*G02B 5/20* (2006.01)
*B29D 11/00* (2006.01)
(Continued)

(52) U.S. Cl.
CPC .......... *G02B 5/208* (2013.01); *B29D 11/00634* (2013.01); *B32B 15/08* (2013.01); *B32B 27/06* (2013.01); *G02B 5/282* (2013.01); *G02B 5/285* (2013.01)

(58) Field of Classification Search
CPC ........ G02B 5/208; G02B 5/282; G02B 5/285; G02B 5/287; G02B 13/14; G02B 13/143; G02B 5/26; G02B 5/28; G02B 5/281; G02B 5/283; G01N 33/54346; G01N 33/587
USPC ................. 359/582, 584, 586, 589, 350–361; 427/206, 421, 422, 162, 163
See application file for complete search history.

(56) References Cited

U.S. PATENT DOCUMENTS

| 3,978,264 A | 8/1976 | Tarbell et al. |
| 4,410,501 A | 10/1983 | Taramasso et al. |

(Continued)

FOREIGN PATENT DOCUMENTS

| EP | 1 046 068 B1 | 5/2003 |
| EP | 2 130 844 A1 | 12/2009 |

(Continued)

OTHER PUBLICATIONS

USPTO Office Action dated Oct. 30, 2015 in co-pending U.S. Appl. No. 14/028,450.

(Continued)

*Primary Examiner* — Bumsuk Won
*Assistant Examiner* — Ephrem Mebrahtu
(74) *Attorney, Agent, or Firm* — John P. Foryt

(57) ABSTRACT

Traditional solar control applications rely on thin metal films to reflect EM radiation with wavelengths longer than that of the visible spectrum. Unfortunately such films also block radiation in cellular, GPS, and radio frequency bands. In one aspect, the disclosure provides a selectively-blocking filter that uses one or more optical filters tuned to a specific range(s) of wavelengths (e.g. for blocking IR radiation), while readily transmitting other wavelengths (e.g. both visible light and cellular/GPS signals). The filters can be manufactured on both flexible and rigid substrates.

18 Claims, 2 Drawing Sheets

(51) Int. Cl.
*B32B 15/08* (2006.01)
*B32B 27/06* (2006.01)
*G02B 5/28* (2006.01)

(56) References Cited

U.S. PATENT DOCUMENTS

| | | | |
|---|---|---|---|
| 4,952,457 | A | 8/1990 | Cartier et al. |
| 4,973,511 | A | 11/1990 | Farmer et al. |
| 5,019,197 | A | 5/1991 | Henderson |
| 5,091,258 | A | 2/1992 | Moran |
| 5,264,058 | A | 11/1993 | Hoagland et al. |
| 5,609,943 | A | 3/1997 | DeKoven et al. |
| 5,818,564 | A | 10/1998 | Gray et al. |
| 5,925,228 | A | 7/1999 | Panitz et al. |
| 6,055,088 | A | 4/2000 | Fix et al. |
| 6,221,112 | B1 | 4/2001 | Snider |
| 6,627,175 | B2 | 9/2003 | Schoebrechts |
| 7,311,943 | B2 | 12/2007 | Jacobson et al. |
| 8,234,998 | B2 | 8/2012 | Krogman et al. |
| 8,277,899 | B2 | 10/2012 | Krogman et al. |
| 8,689,726 | B2 | 4/2014 | Krogman et al. |
| 2001/0046564 | A1 | 11/2001 | Kotov |
| 2001/0048975 | A1 | 12/2001 | Winterton et al. |
| 2002/0055552 | A1 | 5/2002 | Schliesman et al. |
| 2003/0167878 | A1 | 9/2003 | Al-Salim et al. |
| 2005/0019550 | A1 | 1/2005 | McGurran et al. |
| 2005/0025976 | A1 | 2/2005 | Faris |
| 2006/0029634 | A1* | 2/2006 | Berg ............... A61K 9/145 424/422 |
| 2006/0234032 | A1 | 10/2006 | Morrison et al. |
| 2007/0032869 | A1 | 2/2007 | Gilliard et al. |
| 2007/0054194 | A1 | 3/2007 | Zhang et al. |
| 2007/0104922 | A1 | 5/2007 | Zhai et al. |
| 2008/0060302 | A1 | 3/2008 | Bletsos et al. |
| 2008/0299036 | A1 | 12/2008 | Vitner et al. |
| 2009/0015908 | A1 | 1/2009 | Ando et al. |
| 2009/0029077 | A1 | 1/2009 | Atanasoska et al. |
| 2009/0153953 | A1* | 6/2009 | Banerjee ............ G02B 5/0833 359/359 |
| 2009/0155545 | A1 | 6/2009 | Purdy et al. |
| 2009/0161220 | A1 | 6/2009 | Banerjee et al. |
| 2009/0209665 | A1 | 8/2009 | Fu et al. |
| 2009/0324910 | A1 | 12/2009 | Gemici et al. |
| 2010/0003499 | A1 | 1/2010 | Krogman et al. |
| 2010/0092377 | A1 | 4/2010 | Scott et al. |
| 2010/0098902 | A1 | 4/2010 | Kotov et al. |
| 2010/0208349 | A1* | 8/2010 | Beer ............... G02B 1/04 359/580 |
| 2010/0209593 | A1 | 8/2010 | Banerjee et al. |
| 2010/0304150 | A1 | 12/2010 | Zheng et al. |
| 2010/0315693 | A1 | 12/2010 | Lam et al. |
| 2011/0014366 | A1 | 1/2011 | Nogueira et al. |
| 2011/0089018 | A1 | 4/2011 | Chang et al. |
| 2011/0135888 | A1 | 6/2011 | Xu et al. |
| 2011/0274767 | A1 | 11/2011 | Kato et al. |
| 2012/0028005 | A1 | 2/2012 | Zheng et al. |
| 2012/0082831 | A1 | 4/2012 | Wang et al. |
| 2012/0194819 | A1* | 8/2012 | Varma ............... G01N 21/55 356/445 |
| 2013/0108832 | A1 | 5/2013 | Domercq et al. |
| 2013/0183516 | A1* | 7/2013 | Krogman ............ C08J 5/18 428/307.3 |
| 2013/0273242 | A1 | 10/2013 | Krogman et al. |
| 2014/0079884 | A1 | 3/2014 | Krogman et al. |
| 2014/0079922 | A1 | 3/2014 | Wang et al. |
| 2014/0220351 | A1 | 8/2014 | Krogman et al. |
| 2014/0242321 | A1 | 8/2014 | Schmid et al. |
| 2014/0242393 | A1 | 8/2014 | Olmeijer et al. |

FOREIGN PATENT DOCUMENTS

| | | | |
|---|---|---|---|
| EP | 2226364 | A1 | 9/2010 |
| EP | 2 343 579 | A1 | 7/2011 |
| GB | 1 511 652 | A | 5/1978 |
| GB | 2 198 739 | A | 6/1988 |
| JP | H 04 197427 | A | 7/1992 |
| JP | 11 292537 | A | 10/1999 |
| JP | 2008 041377 | A | 2/2008 |
| JP | 2010 132514 | A | 6/2010 |
| KR | 10-2004-0086912 | A | 10/2004 |
| KR | 10-2005-0059582 | A | 6/2005 |
| KR | 10-2011-0082625 | A | 7/2011 |
| KR | 10-2011-0083729 | A | 7/2011 |
| WO | WO 00/10934 | A1 | 3/2000 |
| WO | WO 2005/072947 | A1 | 8/2005 |
| WO | WO 2012/075309 | A1 | 6/2012 |

OTHER PUBLICATIONS

Wu et al.; "Deformable Antireflection Coatings from Polymer and Nanoparticle Multilayers"; Advanced Materials, 2006, 18, pp. 2699-2702.
USPTO Office Action dated Nov. 5, 2015 in co-pending U.S. Appl. No. 13/967,770.
Nolte, Adam John, Fundamental Studies of Polyelectrolyte Multilayer Films: Optical, Mechanical, and Lithographic Property Control. Thesis (PhD), Massachusetts Institute of Technology, Dept. of Materials Science and Engineering, Feb. 2007.
International Searching Authority, International Search Report and Written Opinion, PCT/US12/59142, Apr. 29, 2013.
Co-pending U.S Appl. No. 14/569,955, filed Dec. 15, 2014, Nand et al.
ASTM G173-03; Standard Tables for Reference Solar Spectral Irradiances: Direct Normal and Hemispherical on 37° Tilted Surface.
ASTM D1003-07; Standard Test Method for Haze and Luminous Transmittance of Transparent Plastics.
ASTM D1787-89; Standard Test Method for Pentosans in Cellulose.
ASTM D3359-09$^{e2}$; Standard Test Methods for Measuring Adhesion by Tape Test.
ASTM D4329-13; Standard Practice for Fluorescent Ultraviolet (UV) Lamp Apparatus Exposure of Plastics.
ASTM D4587-11; Standard Practice for Fluorescent UV-Condensation Exposures of Paint and Related Coatings.
Hennink et al.; "Novel crosslinking methods to design hydrogels"; Advanced Drug Delivery Reviews; vol. 54 (2002); pp. 13-36.
Krogman, et al.; "Automated Process for Improved Uniformity and Versatility of Layer-by-Layer Deposition"; Langmuir 2007, 23, pp. 3137-3141.
Lee et al.; "Formation of Nanoparticle-Loaded Microcapsules Based on Hydrogen-Bonded Multilayers"; Chem. Mater.; 2005, vol. 17; pp. 1099-1105.
Rouse, et al.; "Sol-Gel Processing of Ordered Multilayers to Produce Composite Films of Controlled Thickness"; Chem. Mater.; 2000; 12; pp. 2502-2507.
Kim, et al.; "Synthesis and Structures of New Layered Ternary Manganese Tellurides: $AMnTe_2$ (A = K, Rb, Cs) $Na_3Mn_4Te_6$, and $NaMn_{1.56}Te_2$"; Inorg. Chem.; 1999; 38; pp. 235-242.
Kim, et al.; "Hydrothermal synthesis of titanium dioxides using basic peptizing agents and their photocatalytic activity"; Chemical Engineering Science; 62 (2007); pp. 5154-5159.
PCT International Search Report for International Application No. PCT/US2011/064397 with date of mailing Jun. 6, 2012.
PCT International Search Report for International Application No. PCT/US2012/025138 with date of mailing Oct. 30, 2012.
PCT International Search Report for International Application No. PCT/US2012/059147 with date of mailing Mar. 28, 2013.
PCT International Search Report for International Application No. PCT/US2012/062892 with date of mailing Mar. 29, 2013.
PCT International Search Report for International Application No. PCT/US2013/059337 with date of mailing Dec. 6, 2013.
USPTO Office Action dated May 21, 2014 in co-pending U.S. Appl. No. 14/024,649.
USPTO Office Action dated Jul. 23, 2014 in co-pending U.S. Appl. No. 13/633,809.
USPTO Office Action dated Sep. 25, 2014 in co-pending U.S. Appl. No. 14/024,649.
USPTO Office Action dated Feb. 11, 2015 in co-pending U.S. Appl. No. 13/633,809.

(56) References Cited

OTHER PUBLICATIONS

USPTO Office Action dated Jun. 5, 2015 in co-pending U.S. Appl. No. 13/861,368.
USPTO Office Action dated Jul. 8, 2015 in co-pending U.S. Appl. No. 14/246,084.
Cammarata, et al.; "Carbodiimide Induced Cross-Linking, Ligand Addition, and Degradation in Gelatin"; Molecular Pharmaceutics; 2015; 12; pp. 783-793.
USPTO Office Action dated Sep. 8, 2015 in co-pending U.S. Appl. No. 13/633,809.
USPTO Office Action dated Sep. 11, 2015 in co-pending U.S. Appl. No. 14/024,649.
USPTO Office Action dated Dec. 4, 2015 in co-pending U.S. Appl. No. 13/861,368.
USPTO Notice of Allowance dated Jan. 20, 2016 in co-pending U.S. Appl. No. 14/569,955.
USPTO Notice of Allowance dated Feb. 11, 2016 in co-pending U.S. Appl. No. 14/569,955.
USPTO Office Action dated Feb. 16, 2016 in co-pending U.S. Appl. No. 13/633,809.
USPTO Office Action dated Feb. 19, 2016 in co-pending U.S. Appl. No. 14/246,084.
USPTO Office Action dated Mar. 18, 2016 in co-pending U.S. Appl. No. 14/267,944.
PCT International Search Report for International Application No. PCT/US2015/063082 with date of mailing Mar. 24, 2016.

\* cited by examiner

BROADBAND SOLAR CONTROL FILM

CROSS-REFERENCE TO RELATED APPLICATIONS

This application claims priority to PCT/US12/59142, filed Oct. 5, 2012, and to U.S. Patent Appl. No. 61/544,943, filed Oct. 7, 2011, the contents of which are incorporated herein by reference.

INTRODUCTION

Heat rejection films are normally applied to glass or plastic windows to reduce the amount of infrared (IR), visible light, ultraviolet (UV), and/or other electromagnetic (EM) radiation entering windows. Such films are designed to allow only desirable portions of the incoming solar spectrum to penetrate the window. The films are often used to block IR radiation, thus reducing solar heating through the windows and keeping interior spaces relatively cool.

Some traditional solar control films rely on thin metal films that can reflect EM radiation with wavelengths longer than those of the visible spectrum. Such films have high transparency and high heat rejection. They contain a significant amount of silver or silver-gold alloys and are very conductive. But these films also block other unintended portions of the EM spectrum including RF and microwave frequencies, interfering with cell phone and radio signals. This has become a more and more important drawback in recent years with increased use of cell phones, GPS, and other mobile device uses. Another drawback is that metal films are subject to corrosion upon weathering or exposure to humidity, making their lifetimes very limited. Furthermore, thin metal films can be deposited using only highly-controlled vacuum systems which are extremely expensive to purchase, maintain and operate.

SUMMARY

In one aspect, there is provided a filter comprising a first integrated stack, the first integrated stack comprising: (a) a first film (A) comprising one or more of a first bilayer, wherein the first bilayer comprises a polyelectrolyte, and wherein the first film has a refractive index $n_A$; and (b) a second film (B) planarly contacting the first film (A) and comprising one or more of a second bilayer, wherein the second bilayer comprises a polyelectrolyte, and wherein the second film has a refractive index $n_B$, wherein: at least one of the polyelectrolyte of the first film (A) or the polyelectrolyte of the second film (B) comprises a polymer polyelectrolyte; $n_A$ and $n_B$ differ by at least 0.4; and the filter selectively reflects electromagnetic radiation within a band of wavelengths around a selected wavelength $\lambda_1$.

In embodiments:

The filter comprises a substrate planarly contacting the integrated stack.

The polyelectrolyte of the first film is a polymer polyelectrolyte, and wherein the first bilayer further comprises nanoparticles.

The polyelectrolyte of the second film is a polymer polyelectrolyte, and wherein the second bilayer further comprises nanoparticles.

The band of wavelengths has a full width half maximum of at least 50 nm.

The first integrated stack is porous, and wherein the filter optionally comprises crosslinking materials in at least a portion of the pores.

The first integrated stack comprises a plurality of first films (A) and a plurality of second films (B), wherein: each of the plurality of second films (B) is planarly contacting a first film (A) such that the first and second films are arranged in an alternating sequence.

The total number of first and second films in the first integrated stack is odd.

The filter comprises a second integrated stack planarly contacting the first integrated stack or planarly contacting an optional intermediate layer between the first and second integrated stacks, wherein the second integrated stack selectively reflects electromagnetic radiation and comprises: (i) a third film (C) having a refractive index $n_C$; and (ii) a fourth film (D) planarly contacting the third film and having a refractive index $n_D$, wherein: $n_C$ is greater than $n_D$ by at least 0.4; the second stack reflects electromagnetic radiation within a band of wavelengths around a selected wavelength $\lambda_2$; and the filter reflects electromagnetic radiation within a band of wavelengths around $(\lambda_1+\lambda_2)/2$.

The filter comprises a plurality of third films (C) and a plurality of fourth films (D), wherein: each of the plurality of third films (C) is planarly contacting a fourth film (D) such that the third and fourth films are arranged in an alternating sequence.

The optical thickness of each of the third films (C) and each of the fourth films (D) is $\lambda_2/4$.

The optional intermediate layer is present and comprises a non-metal film (E) having a refractive index $n_E$ and a thickness equal to $(\lambda_1+\lambda_2)/8$.

The filter does not significantly block (e.g., blocks less than or equal to 25, 20, 15, 10, 5, 3, or 1%) signals selected from GPS, RF, cellular, and combinations thereof.

For a given $T_{vis}$: $T_{ser}>74.7-0.3098*T_{vis}$, and $A_{sol}<10\%$.

In another aspect there is provided a method for forming the filter as described above, the method comprising the following steps: (a) depositing a first film (A) onto a substrate using a Layer-by-Layer (LbL) deposition method; (b) depositing a second film (B) onto the first film (A) using an LbL deposition method; (c) depositing a first film (A) onto the second film (B) from (b) using an LbL deposition method; (d) repeating steps (b) and (c) a plurality of times to form the filter.

In another aspect, there is provided a filter comprising a first integrated stack, the first integrated stack comprising: (a) a first film (A) comprising one or more of a first bilayer, wherein the first bilayer comprises one or more polyelectrolytes, and wherein the first film has a refractive index $n_A$; and (b) a second film (B) comprising one or more of a second bilayer, wherein the second bilayer comprises one or more polyelectrolytes, and wherein the second film has a refractive index $n_B$ wherein: the second film (B) is in planar contact with the first film (A); $n_A$ and $n_B$ differ by at least 0.4; the filter selectively reflects electromagnetic radiation; and the reflected electromagnetic radiation comprises a band of wavelengths around $\lambda_1$.

In embodiments:

$n_A$ and $n_B$ differ by at least 0.5 or by at least 0.6.

The filter comprises a substrate in planar contact the integrated stack.

the first film and the second film each comprise a polymer polyelectrolyte and nanoparticles, wherein the polymer polyelectrolyte of the first film and the polymer polyelectrolyte of the second film are independently selected, and wherein the nanoparticles of the first film and the nanoparticles of the second film are independently selected.

the nanoparticles are polyelectrolytes and are selected from oxides, nitrides and sulfides of silicon, titanium, cerium, zinc, iron, tin, aluminum, zirconium, tungsten, vanadium, niobium or combinations thereof.

the polymer polyelectrolyte is selected from the group consisting of polydiallyldimethylammonium chloride, polyacrylic acid, sulfonated polystyrene, chitosan, carboxymethylcellulose, hyaluronic acid, polyvinylpyrollidone, polyvinylalcohol, polyallylamine, polythiophenes, polyethyleneimines, polyacrylamides or copolymers or combinations thereof.

the band of wavelengths around $\lambda_1$ has a full width half maximum of at least 50 or at least 150 nm.

the first integrated stack is porous.

the filter comprises crosslinking materials in at least a portion of the pores.

the first integrated stack is porous, and wherein the filter further comprises thermochromic liquid crystals, dyes or photochromic liquid crystals materials in at least a portion of the pores.

the filter reflects at least 40, 80, or 99% of radiation of wavelength $\lambda_1$.

the first film and the second film each has an optical thickness of $\lambda_1/4$.

the first film and the second film each has a different optical thickness.

The filter comprises a plurality of first films and second films arranged in an alternating sequence (ABABA . . . ).

the total number of films (A) and (B) of the alternating sequence is an odd number, and wherein the alternating sequence begins and ends with film A, and wherein $n_A$ is greater than $n_B$.

the total number of films (A) and (B) of the alternating sequence is an even number.

$\lambda_1$ has a range between about 700-1100 nm or between 825-960 nm.

In another aspect, there is provided an article comprising the filter of claim 1 and comprising a second filter for selectively reflecting electromagnetic radiation, the second filter comprising: a second integrated stack of films in planar contact with the first integrated stack, the second integrated stack comprising: (i) one or more of a third film (C) that has a refractive index $n_C$; and (ii) one or more of a fourth film (D) that has a refractive index $n_D$, wherein the fourth film is in planar contact with the third film, and wherein: the total number of films (C) and (D) is odd, and wherein the films (C) and (D) are arranged in a sequence CDCDC; $n_C$ is greater than $n_D$ by at least 0.4; the second stack reflects electromagnetic radiation within a range of wavelengths around $\lambda_2$; and the article reflects electromagnetic radiation within a range of wavelengths around $(\lambda_1+\lambda_2)/2$.

In embodiments:

the second stack reflects at least 40% of radiation of wavelength $\lambda_2$.

the optical thickness of each of the third (C) films and each of the fourth (D) films is $\lambda_2/4$.

The filter comprises an additional non-metal film (E) between the first stack and the second stack, wherein film (E) has a refractive index $n_E$.

the film E has a thickness equal to $(\lambda_1+\lambda_2)/8$.

$\lambda_2$ has a range between about 700-1600 nm, or between 1000-1300 nm.

reflection by the article within the range of wavelengths around $(\lambda_1+\lambda_2)/2$ has a full width half maximum of greater than or equal to 100 or 350 nm.

the filter does not significantly block signals selected from GPS, RF, cellular, and combinations thereof.

the filter blocks less than 10% of the energy in a signal having a wavelength greater than 1 mm.

the filter blocks less than 5% of the energy of a signal having a wavelength greater than 1 mm.

the signal has a frequency between 500 MHz and 3 GHz, or between 1 GHz and 2 GHz, or between 3 MHz and 30 MHz.

In another aspect, there is provided a filter for selectively reflecting bands of electromagnetic radiation, the filter comprising: (a) a first integrated stack of porous films, comprising: (i) one or more of a first film (A) that has a refractive index $n_A$; and (ii) one or more of a second film (B) that has a refractive index $n_B$, wherein each of the one or more second films (B) is in planar contact with a first film (A), and wherein: the total number of films in the first integrated stack is odd and the films are arranged in an alternating sequence ABA . . . BA; $n_A$ is greater than $n_B$ by at least 0.4; and the first integrated stack reflects electromagnetic radiation within a range of wavelengths around $\lambda_1$; (b) a second integrated stack of porous films in planar contact with the first stack, the second stack, comprising: (i) one or more of a third film (C) that has a refractive index $n_C$; and (ii) one or more of a fourth film (D) that has a refractive index $n_D$, wherein each of the one or more fourth films (D) is in planar contact with a third film (C), and wherein: the total number of films in the second integrated stack is odd and the films are arranged in a sequence CDC . . . DC; $n_C$ is greater than $n_D$ by at least 0.4; and the second integrated stack reflects electromagnetic radiation within a range of wavelengths around $\lambda_2$; and (c) an intervening film between the first integrated stack and the second integrated stack, the intervening film having a thickness $((\lambda_1+\lambda_2)/8)$ and a refractive index $((n_A+n_B+n_C+n_D)/4)$.

the filter does not significantly block signals selected from GPS, RF, cellular, and combinations thereof.

the filter blocks less than 10% of the energy in a signal having a wavelength greater than 1 mm.

the filter blocks less than 5% of the energy of a signal having a wavelength greater than 1 mm.

the signal has a frequency between 500 MHz and 3 GHz, or between 1 GHz and 2 GHz, or between 3 MHz and 30 MHz.

In another aspect, there is provided a method of fabricating a filter for selectively reflecting electromagnetic radiation, the method comprising the steps of: (a) depositing an A-type porous, polymer-containing, film onto a substrate using a Layer-by-Layer (LbL) deposition method; (b) depositing a B-type porous, polymer-containing, film onto the A-type film using an LbL deposition method; (c) depositing an A-type porous, polymer-containing, film onto the B-type film from (b) using an LbL deposition method; (d) repeating steps b and c until a desired number of A-type and B-type films has been deposited.

In embodiments:

The filter comprises adding one or more additional materials to the filter that absorb into at least a portion of the pores.

the one or more additional materials are selected from materials that can be crosslinked.

the one or more additional materials are selected from the group consisting of thermochromic liquid crystals, dyes and photochromic liquid crystals.

In another aspect, there is provided an article comprising a filter as above disposed on a substrate.

In another aspect, there is provided an article comprising a filter as above and an additional article of solar control.

In embodiments of the article:

the article of solar control comprises an IR absorbing material.

the article of solar control comprises a metal oxide, or insulator.

the article of solar control is encapsulated, and wherein the article comprises an optionally encapsulated IR absorbing film.

In another aspect, there is provided a filter as above, wherein for a given $T_{vis}$, $T_{ser}>74.7-0.3098*T_{vis}$ and $A_{sol}<10\%$.

In embodiments:

the filter comprises one or more bilayers, and wherein each bilayer comprises two materials having complementary binding groups.

the two materials are polyelectrolytes of opposite charge.

the one or more bilayers forms a porous film.

the bilayers are prepared using a layer-by-layer deposition method.

$T_{vis}$ is between 20 and 100%.

transmission of frequencies <1 THz is greater than or equal to 10, 25, or 50%.

In another aspect, there is provided an article comprising a filter as above, wherein for a given $T_{vis}$, $T_{ser}>74.7-0.3098*T_{vis}$, and $A_{sol}<62.5-0.25*T_{vis}$ In embodiments:

$T_{vis}>70\%$ and $R_{sol}>21\%$ $T_{vis}>75\%$ and $R_{sol}>20\%$.

transmission of frequencies <1 THz is greater than 10, 25, or 50%.

In another aspect there is provided herein a filter for selectively reflecting bands of electromagnetic radiation. The filter has an integrated stack of porous, polymer-containing films of at least two types, A and B, in planar contact with one another. Film A has a refractive index $n_A$, and Film B has a refractive index $n_B$. The values of $n_A$ and $n_B$ differ by at least 0.4. The reflected electromagnetic radiation includes radiation of a particular wavelength, $\lambda_1$. In some arrangements, the difference between $n_A$ and $n_B$ can be least 0.5, or at least 0.6. In some embodiments the integrated stack of porous films can be in planar contact with a substrate.

In another aspect there is provided herein a filter for selectively reflecting broader bands of electromagnetic radiation. The filter has a first integrated stack of porous, polymer-containing films of at least two types, A and B, in planar contact with one another. There can be an odd number of films arranged in a sequence ABA . . . BA. The A film has a refractive index $n_A$, and the B film has a refractive index $n_B$. The values of $n_A$ and $n_B$ differ by at least 0.4, and $n_A$ is greater than $n_B$. The first stack reflects electromagnetic radiation that includes radiation of wavelength $\lambda$. The filter has a second integrated stack of porous, polymer-containing films of at least two types, C and D, in planar contact with one another. There can be an odd number of films arranged in a sequence CDC . . . DC. The C film has a refractive index $n_C$; and the D film has a refractive index $n_D$. The values of $n_C$ and $n_D$ differ by at least 0.4, and $n_C$ is greater than $n_D$. The second stack reflects a band of electromagnetic radiation that includes radiation of wavelength $\lambda_2$. There is an intervening film between the first integrated stack and the second integrated stack and the intervening film has a thickness equal to $((\lambda_1+\lambda_2)/8)$.

These and other aspects of the invention are described in more detail below.

Figure 1A:
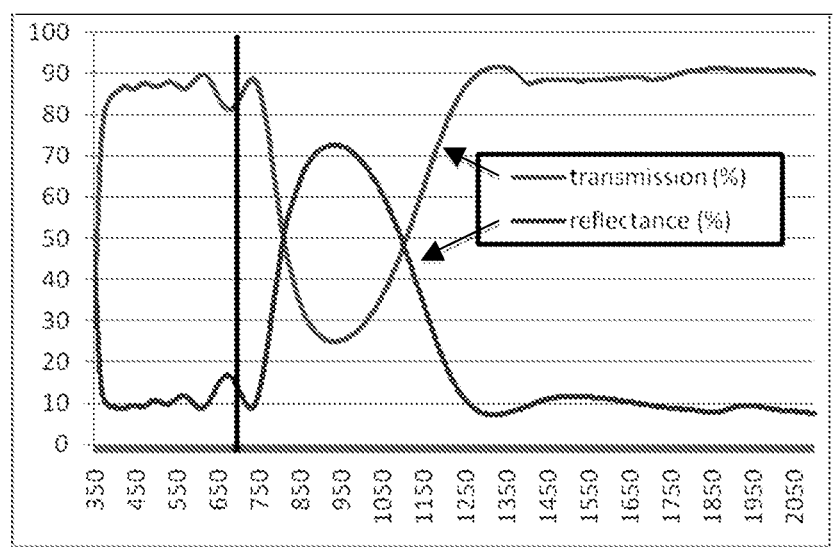
FIGS. 1a and 1b provide reflectance and transmittance v. wavelength data for a QWOT integrated stack and a CBR integrated stack prepared according to the disclosure.

a first integrated stack with a first film (11, hereinafter referred to as A) comprising two or more of a first bilayer and a second film (12, hereinafter referred to as B) comprising two or more of a second bilayer;

a second integrated stack with a third film (13, hereinafter referred to as C), and a fourth film (14, hereinafter referred to as D), an optional intermediate layer 15 between the first and second integrated stack; on a substrate 2.

DETAILED DESCRIPTION OF PARTICULAR EMBODIMENTS

Examples of embodiments of interest are described herein in the context of reflecting IR radiation and allowing transmission of visible light. It should be readily apparent to a person of ordinary skill in the art that the filters described herein can be designed to reflect other portions of the EM spectrum through careful choice of materials and film thicknesses. Likewise, the filters described herein can be designed to provide for bands of radiation transmission other than those described in the examples of the present disclosure.

Relevant portions of the publications referred to herein are incorporated by reference in their entirety for all purposes as if fully set forth herein.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein. It is understood that the present disclosure supersedes any disclosure of an incorporated publication to the extent there is a contradiction.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The term "bilayer" as used herein refers to a film comprising a layer of a first material and a layer of a second material. As described herein, in some embodiments bilayers are conveniently prepared using a layer-by-layer (LbL) assembly process.

The term "film" is used herein to mean a thickness of material comprising one or more bilayers.

For the purposes of this disclosure, the terms "integrated stack," or "stack" are used interchangeably to mean a stack of individual films that each has individual characteristics, which, in combination, provide for a film having desired characteristics.

As used herein, two layers are "planarly contacting" when they are in contact along their faces—i.e., they are disposed one on top of the other along the axis that is perpendicular to the plane of the layer.

As used herein, the term "solar control" refers to the ability to selectively filter (i.e., reflect or transmit) one or more wavelengths of electromagnetic (EM) radiation. For example, in some embodiments described herein certain wavelengths are selectively allowed to pass through a coated substrate. Also for example, in some embodiments described herein certain wavelengths are selectively reflected by a coated substrate. Also for example, in some embodiments described herein solar control refers to a filter that selectively passes certain wavelengths or bands of wavelengths and acts as a barrier to other wavelengths or bands of wavelengths. Some of the wavelengths allowed to pass and/or some of the wavelengths that are reflected may be present in solar radiation, but "solar control" as used herein is not intended to be so limited and is intended to include filtering or selective passing of other forms of EM radiation. For example, wavelengths commonly used in mobile communications and global positioning systems (GPS) are intended to be included.

As used herein, the term "block," as in a filter "blocks" EM radiation, is meant to include blockage via absorption of the radiation, deflection of the radiation, reflection of the radiation, and combinations thereof.

In some embodiments, the films described herein include one or more dichroic mirrors, each tuned to reflect a selected range(s) of wavelengths, such as IR radiation, while transmitting both visible light and cellular/GPS signals. Such stacks find use for solar control use in buildings, homes, displays, pigment applications and vehicles. In some embodiments, such stacks can be integrated into a laminated glass unit for applications in safety windshields. In some embodiments, such stacks can be integrated into insulated glass units as a suspended film. In some embodiments such stacks can be applied to windows with adhesives as aftermarket films. In some embodiments they can be integrated with LCD displays to prevent brownout at high temperatures. In some embodiments such stacks can be incorporated into pigment technology for reducing heat of painted objects. In some embodiments such stacks can be incorporated into solar cells for decreasing operating cell temperature to improve efficiency. In some embodiments, such stacks can be used for thermal management.

In some embodiments, the compositions and methods of the present disclosure provide for the rapid creation of integrated stacks, preparation of integrated stacks on large area substrates, preparation of integrated stacks via an ambient process, and/or preparation of integrated stacks at low cost. In addition, in some embodiments the physical properties of films made using such a process can be easily adjusted to achieve desired values of refractive indices in contrast to thin film deposition techniques which rely on bulk refractive indices (i.e. sputtering).

In some embodiments of the compositions and methods of the present disclosure, optical reflecting structures other than dichroic mirrors are made using the films disclosed herein. For example, such optical reflecting structures include, but are not limited to, Bragg reflectors, rugate filters, Fabry-Perot cavities and gradient index filters. By varying the refractive indices of films, the thicknesses of the films, the numbers of the films, and other factors any number of useful optical structures can be made with any number of useful reflecting, absorbing and transmitting properties.

In some embodiments, the materials and methods described herein allow production of robust films that have solar heat gain coefficients (SHGCs), total solar energy rejection ($T_{ser}$), visible color, solar absorbance ($A_{sol}$), visible reflection, and/or visible light transmission ($T_{vis}$) characteristics comparable to or better than that of previously available films. For example, and as described herein in more detail, in some embodiments, the films of interest have improved SHGC that are more than 10% lower, or more than 15% lower, or more than 20% lower, or more than 25% lower, or more than 30% lower, or more than 40% lower, or more than 50% lower than the SHGC of previously available films such as multilayer silver based films. At the same time, in some embodiments, the films of interest have values of $T_{vis}$ that are equivalent to, or 5% higher, or 10% higher, or 15% higher, or 20% higher than the previously available films. Furthermore, unlike the previously available films, in some embodiments the films described herein have little or no adverse effects on cellular phone or GPS signals.

The sun emits radiation, in varying amounts, in the UV, visible and IR range, from 300-2500 nm (see ASTM Standard G-173-03). The solar spectrum can be plotted as irradiance as a function of wavelength. The range of wavelengths that is visible to the human eye is about 400-700 nm. Outside of this range roughly 40% of solar radiation falls into the infrared (IR) category and accounts for about half the heating of the Earth. Solar control films on windows (e.g., using thin metal coatings) have been previously developed to filter out the IR portion of the solar spectrum in order to reduce solar heating of interior spaces. An ideal spectral transmittance curve that maximizes both light transmission and heat rejection would allow transmission from 400-700 nm and not allow transmission at other wavelengths. Based on this standard, a theoretical maximum of SHGC is 0.38, given a $T_{vis}$ of 70%.

The embodiments of the compositions and methods of the present disclosure are described in the context of reflecting IR radiation and allowing transmission of visible light. It should be readily apparent to a person of ordinary skill in the art that the filters described herein can be designed to reflect other portions of the EM spectrum through careful choice of materials, film thicknesses, etc. Likewise, the filters described herein can be designed to provide for bands of radiation transmission and/or reflection other than those described in the examples of the present disclosure.

The dichroic mirrors (also referred to herein as dichroic filters) prepared according to the methods provided herein use the principle of thin-film interference to reflect specific wavelengths of EM radiation. For example, when light strikes the dichroic filters at an angle, some of the light is reflected from the top surface of a bilayer, and some of the light is reflected from the bottom surface where the bilayer is in contact with an underlying bilayer. Because the light reflected from the bottom travels a slightly longer path, some light wavelengths are reinforced by this delay, while others tend to be canceled, producing the observed filtering effect.

In one embodiment, the present disclosure provides dichroic mirrors which include alternating films of optical films with different refractive indexes (RIs)—e.g., a "high" RI and a "low" RI. The interfaces between films with different RIs produce phased reflections, selectively reinforcing certain wavelengths (constructive interference) and cancelling other wavelengths (destructive interference). By selecting certain variables such as film thickness, refractive indices, and number of the films, as explained in more detail below, the band(s) of reflected and/or transmitted wavelengths can be tuned and made as wide or narrow as desired.

In some embodiments, the present disclosure also provides porous polymer-containing films. In some such embodiments, the porous films comprise air within the pores, and are readily adaptable to different stresses (e.g., temperature) as the polymer and air imparts ductility into the thin film. In some embodiments the integrated stacks described herein comprise a non-porous encapsulation layer. In some embodiments, the presence of a certain amount of porosity within the films of interest provides more surface area to mate to an encapsulating material, and/or provides for strong adhesion between the integrated stacks and the surface to which the stack is mated. For example, in some embodiments the films of interest have a porosity greater than or equal to 0.05, 0.1, 0.15, 0.2, 0.25, 0.3, 0.4, or 0.5.

Dichroic mirrors (or filters) can be designed to reflect specific wavelengths of incident EM energy. For example, a mirror can be built to specifically reflect wavelength $\lambda_1$. Such a mirror may comprise a reflective substrate and disposed thereon a stack of films. The stack of films may comprise alternating first and second films. The first films have a high RI equal to $n_H$ and the second films have a low RI equal to $n_L$, wherein $n_H$ is significantly higher (e.g., higher by a value equal to or more than 0.4, 0.5, 0.6, etc.) than $n_L$.

In one embodiment of the dichroic mirrors (or filters) just described, the material forming the high RI films and the material forming the low RI films each comprise polyelectrolytes and nanoparticles. In one embodiment of the invention, the polyelectrolytes can be one or more of polydiallyldimethylammonium chloride, polyacrylic acid, sulfonated polystyrene, chitosan, carboxymethylcellulose, hyaluronic acid, polyvinylpyrollidone, polyvinylalcohol, polyallylamine, polythiophenes, polyethyleneimines, polyacrylamides or copolymers of the above mentioned. In one embodiment of the invention, the nanoparticles can be one or more of doped and undoped oxides, nitrides or sulfides of metals. For example, such metals include, but are not limited to, silicon, titanium, indium, cerium, zinc, iron, tin, aluminum, zirconium, tungsten, vanadium, niobium or combinations thereof. RIs $n_H$ and $n_L$ can be made different, by selecting different nanoparticles for the first and second materials. In general, the larger the difference in the RIs of the nanoparticles in each film, the larger is the difference in the RIs of the films. Processing conditions can also influence the RIs of the films as will be discussed in more detail below.

Optical thickness is defined as:

$$t = nd \qquad (1)$$

where n is the refractive index and d is the actual physical thickness of the film. In some embodiments, the high RI films and the low RI films have optical thicknesses equal to each other. In some embodiments, they can each have an optical thickness equal to $\lambda_1/4$. Such stacks of films can be referred to as having QWOTs (quarter wavelength optical thickness). In some embodiments, the optical thicknesses of the high RI films and the low RI films are not the same, especially for designs that provide less angular dependence. See, for example, U.S. Patent Application Publication Number 2010/0209593 (by Banerjee et al, published Aug. 19, 2010) or U.S. Patent Application Publication Number 2009/0161220 (by Banerjee et al, published Jun. 5, 2009). In some embodiments, the physical thicknesses of the high RI films and the low RI films are not the same.

In some embodiments the mirror or filter just described has a plurality of films (i.e., the high RI films and the low RI films) arranged in a repetitive sequence such as ABABA . . . In some embodiments, there are an odd number of films. In some arrangements there are 3, 5, 7, 9, or 11 films, or more than 11 films. In some embodiments, there are greater than 6 films, or greater than 10 films, or greater than 15 films, or greater than 20 films, or greater than 25 films. In some embodiments, dichroic mirrors with 100 or more films are prepared according to the methods disclosed herein. In some embodiments, better reflection is obtained with a relatively larger number of films (e.g., greater than 7, or greater than 10 films) In some embodiments, the number of films is less than a specified amount, such as less than 25, or less than 20, or less than 15, or less than 10 films. In some embodiments the number of films is optimized to provide for a desired level of reflection and/or optimized with respect to the number of processing steps and cost or complexity of production.

It will be appreciated that each of the films just described is comprised of bilayers and can comprise an independently selected number of bilayers, such as 1 bilayer, or 2, or 3, or 4, or 5, or 6, or 7, or 8, or 9, or 10, or 15, or 20, or more than 20 bilayers.

The refractive indices of the various films used within the structures of interest can range from less than 1.2 to greater than 2.5. For example, the RI of one or more films can be equal to or greater than 1.1, 1.2, 1.3, 1.4, 1.5, 1.6, 1.7, 1.8, 1.9, 2.0, 2.1, 2.2, 2.3, or 2.4. In some embodiments the RI of one or more films is less than or equal to 2.5, 2.4, 2.3, 2.2, 2.1, 2.0, 1.9, 1.8, 1.7, 1.6, 1.5, 1.4, 1.3, or 1.2. In some embodiments, the "high" RI (i.e., the RI for the films within a structure of interest that has a "high" value) is greater than or equal to 1.5, 1.6, 1.7, 1.8, 1.9, 2.0, 2.1, 2.2, 2.3, or 2.4. In some embodiments, the "low" RI (i.e., the RI for the films within a structure of interest that has a "low" value) is less than or equal to 2.0, 1.9, 1.8, 1.7, 1.6, 1.5, 1.4, 1.3, or 1.2. In some embodiments of the films of interest, the value of the "high" RI and the value of the "low" RI differs by at least 0.3, or at least 0.4, or at least 0.5, or at least 0.6, or at least 0.7, or at least 0.8. In some embodiments, the "high" RI is between 1.5 and 2.5, and the "low" RI is between 1.2 and 2.0. It will be appreciated, however, that the "high" RI is always greater than the "low" RI.

In some embodiments, there are an odd number of total films (i.e., an odd number of the high RI films and the low RI films). In some embodiments, the outermost films have an RI that is higher than the RI of the other films. The layers alternate between a lower RI value and a higher RI value, and the outermost layers of the overall structure are made of the material having the higher RI value.

In another embodiment, an even number of films is used. This can be especially useful when the dichroic mirror is encapsulated with a material, or in planar contact with a material, that is optically active or provides some optical functionality. More details about such a structure can be found in co-pending U.S. Provisional Patent Application Ser. No. 61/702,112, filed Sep. 17, 2012.

When an incoming radiation wave of wavelength $\lambda$ meets a mirror or filter as just described, the wave follows a predictable path. When the incident wave $\lambda_1$ reaches the interface between air and the first film, some of the wave $\lambda_1$ reflects back to the air as $R_1$ and the rest is transmitted farther into the mirror or filter. At the interface between the first film and the second film, another part of the wave $\lambda_1$ is reflected back as $R_2$. Similarly, there is a reflection $R_3$, $R_4$, $R_5$, $R_6$, etc. at the interface between films deeper within the mirror or filter.

There are phase relationships among the reflections. Each reflection travels a path that is $\lambda_1/2$ longer than the one before it. All odd number reflections $R_{odd}$ are in phase with one another. For example, $R_3$ has traveled a whole wavelength $(2 \times \lambda_1/2)$ farther than $R_1$ so that $R_1$ and $R_3$ are in phase, interfering constructively with one another. Similarly, all even number reflections $R_{even}$ are in phase with one another, but they are also out of phase with the odd number reflections by half a wavelength. The even number reflections interfere destructively with the odd number reflections. Thus reflections of incident radiation with wavelength $\lambda_1$ cancel one another out. With sufficient number of high RI and low RI films, total reflection of incident radiation with wavelength $\lambda_1$ can be achieved. In some arrangements, the dichroic filter as just described can reflect at least 40%, or at least 50%, or at least 60%, or at least 70%, or at least 80%, or at least 90%, or at least 99%, of radiation of wavelength $\lambda_1$.

Although the dichroic mirror may be rated for a particular wavelength $\lambda_1$, depending on the values of the refractive indices of the films, the mirror can be designed to reflect a desired band of wavelengths ($\Delta\lambda$) around wavelength $\lambda_1$. The breadth of reflected wavelengths is give by the expression:

$$\Delta\lambda = \frac{4*\lambda_1}{\pi}\sin^{-1}\left(\frac{\eta_H - \eta_L}{\eta_H + \eta_L}\right) \quad (2)$$

The greater the difference in the RIs (n) of the films, the broader is the band of reflected wavelengths. Furthermore, the lower the value of $n_L$, the broader is the band of reflected wavelengths. In some embodiments of the optical reflectors described herein, $n_L$ is less than 1.45, or less than 1.40, or less than 1.35, or less than 1.3, or less than 1.26.

In another embodiment of the invention, two dichroic mirrors, each as described above, are used to make a solar control stack that reflects a broader range of wavelengths than can be achieved with one mirror alone. Such a broadband optical filter is made using two optical filters in planar contact with one another (optionally via an intermediate layer).

As used herein unless otherwise indicated, the term "in planar contact" is used to indicate that one layer or layered structure is contacting (and disposed either above or below) another layer or layered structure. Such contact is facial-contact rather than edge-contact.

The terms "above" and "below" indicate relative proximity to a substrate when a substrate is present, or, when a substrate is not present, indicate relative location along an axis perpendicular to the plane of the layer or layered structure. For example, if a first layer is "above" a second layer in a film on a substrate, the second layer is relatively closer to the substrate than the first (i.e., the second layer is disposed "below" the first). It will be appreciated, however, that intervening layers may be present between the first and second layers.

A broad band filter has two different optical filters separated by an additional (intermediate) film. Each optical filter is of the type discussed above with reference to dichroic mirrors or filters. A first filter is tuned to reflect wavelength $\lambda_1$, and a second filter is tuned to reflect wavelength $\lambda_2$. In one arrangement, $\lambda_1$ is not equal to $\lambda_2$. In some embodiments the first and second filters are in direct planar contact with each other. In some embodiments, an intermediate film is positioned between the first filter and second filter and is a low index film of QWOT thickness (($\lambda_1+\lambda_2$)/8) having a RI corresponding to the mean reference wavelength (($\lambda_1+\lambda_2$)/2) between the two films. Without wishing to be bound to any particular theory, including the intermediate film may serve to mitigate the possibility of peak transmission at the mean of the reference wavelengths.

In general, when two or more dichroic mirrors are used, the resulting reflectance bandwidth, or the reflectance peak, or combinations thereof are greater than can be achieved by a single dichroic filter alone. Using two dichroic mirrors makes it possible to create optical designs of coupled, and bridged, QWOT stacks, and a broadband region of high reflectance in the IR or any other desired region can be achieved. In one arrangement, the bands of reflected wavelengths for each mirror overlap. In another arrangement, the bands of reflected wavelengths for each mirror do not overlap.

For example, in some embodiments, an article of interest comprises first and second dichroic mirrors, which are optionally separated by an intermediate layer. When the intermediate layer is not present, the first and second dichroic mirrors are in planar contact—i.e., a surface of the first dichroic mirror contacts a surface of the second dichroic mirror. The first dichroic mirror selectively reflects electromagnetic radiation comprising a band of wavelengths around $\lambda_1$. Furthermore, the first dichroic mirror comprises an integrated stack, wherein the integrated stack comprises one or more of a first film (A) and one or more of a second film (B). First film (A) comprises two or more of a first bilayer and has a refractive index of $n_A$, and second film (B) comprises two or more of a second bilayer and has a refractive index of $n_B$. Bilayers are described in more detail below. In some embodiments, the first film and the second film each has an optical thickness of $\lambda_1/4$. In some embodiments, the first dichroic mirror comprises a plurality of first films and second films arranged in an alternating sequence (ABABA . . . ).

The second dichroic mirror in the example article described above selectively reflects electromagnetic radiation comprising a band of wavelengths around $\lambda_2$. Furthermore, the second dichroic mirror comprises an integrated stack, wherein the integrated stack comprises one or more of a third film (C) and one or more of a fourth film (D). Third film (C) comprises two or more of a first bilayer and has a refractive index of $n_C$, and fourth film (D) comprises two or more of a second bilayer and has a refractive index of $n_D$. In some embodiments, the third film and the fourth film each has an optical thickness of $\lambda_1/4$. In some embodiments, the second dichroic mirror comprises a plurality of third films and fourth films arranged in an alternating sequence (CDCDC . . . ). The bilayers of the first dichroic mirror and the bilayers of the second dichroic mirror may be made from the same material or from different materials.

In the example article described above, with two dichroic mirrors, the band of wavelengths around $\lambda_1$ has a full width half maximum of at least 50 nm, or at least 100 nm, or at least 150 nm. In some embodiments, the first dichroic mirror reflects at least 40%, or at least 50%, or at least 60%, or at least 70%, or at least 80%, or at least 90%, or at least 99% of incident radiation of wavelength $\lambda_1$. In some embodiments, $\lambda_1$ has a range between about 700 and 1100 nm, or between 740 nm and 1 mm, or between 825 and 960 nm, or between 10 and 400 nm. In some embodiments, the band of wavelengths around $\lambda_2$ has a full width half maximum of at least 50 nm, or at least 100 nm, or at least 150 nm. In some embodiments, the second dichroic mirror reflects at least 40%, or at least 50%, or at least 60%, or at least 70%, or at least 80%, or at least 90%, or at least 99% of incident radiation of wavelength $\lambda_2$. In some embodiments, $\lambda_2$ has a range between about 700 and 1600 nm, or between 740 nm and 1 mm, or between 1000 and 1300 nm, or between 10 and 400 nm.

In the example article described above, with two dichroic mirrors, the article reflects electromagnetic radiation within a range of wavelengths around ($\lambda_1+\lambda_2$)/2. In some embodiments, reflection by the article within the range of wavelengths around ($\lambda_1+\lambda_2$)/2 has a full width half maximum of at least 100 nm, or at least 200 nm, or at least 250 nm, or at least 300 nm, or at least 350 nm. In some embodiments, the article has a refractive index of (($n_A+n_B+n_C+n_D$)/4).

In the example article described above, with two dichroic mirrors, the intermediate layer (when present) may comprise a non-metal material, and have a refractive index $n_E$. In some embodiments, the intermediate layer has a thickness equal to ($\lambda_1+\lambda_2$)/8. In some embodiments, the intermediate layer is selected from a crosslinkable material, a polymer material, a crosslinkable polymer material, a metal oxide, a metal nitride, and combinations thereof. In some embodiments, the intermediate layer is non-porous. In some embodiments, the intermediate layer is optically clear.

The example article described above contains two dichroic mirrors either in planar contact or separated by an intermediate layer. It will be appreciated that the use of two dichroic mirrors is merely exemplary, and that more than two dichroic mirrors (such as 3, or 4, or 5, or 6, or more) can be used. Each dichroic mirror can be tuned to a different $\lambda$, as described in more detail herein. Furthermore, an intermediate layer may be disposed between each pair of dichroic mirrors, or any two dichroic mirrors can be in planar contact (i.e., without a intermediate layer). In this way an article can be prepared capable of reflecting and/or absorbing all, substantially all (e.g. greater than 90%, or greater than 95%, or greater than 99%), or a significant portion (e.g., 50%, or 60%, or 70%, or 80%, or 90%) of the wavelengths in the IR spectrum (i.e., 740 nm to 1 mm wavelengths). Similarly, an article can be prepared capable of reflecting and/or absorbing all, substantially all, or a significant portion of the IR energy that is present in solar radiation and is incident on the filter when exposed to solar radiation.

In some embodiments of the invention, the films that form the dichroic mirrors comprise bilayers, and the bilayers have a polyelectrolyte as one constituent material, and nanoparticles as another constituent material. As described in more detail below, in some embodiments, bilayers are prepared via layer-by-layer (LbL) deposition methods, such as spray, dip, or spin LbL deposition.

In some embodiments, the polyelectrolyte is a polymer polyelectrolyte such as a polymer selected from polydiallyldimethylammonium chloride (PDAC), polyacrylic acid, sulfonated polystyrene, chitosan, carboxymethylcellulose (CMC), hyaluronic acid, polyvinylpyrollidone (PVP), polyvinylalcohol (PVA), polyallylamine (PAA), polythiophenes, polyethyleneimines, polyacrylamides or copolymers or combinations thereof.

In some embodiments, the nanoparticles can be one or more of doped and undoped oxides, nitrides or sulfides of metals. For example, such metals include, but are not limited to, silicon, titanium, cerium, zinc, iron, tin, aluminum, zirconium, tungsten, vanadium, niobium or combinations thereof. For example, in some embodiments, the nanoparticles comprise titania ($TiO_2$), silica ($SiO_2$), aluminum oxide ($Al_2O_3$), or the like. In some embodiments, the nanoparticles comprise mixed metal oxides—e.g., the nanoparticles comprise titania and silica, or titania and alumina. In some embodiments, the nanoparticles comprise a plurality of electrostatic charges and are therefore polyelectrolytes.

The RIs of adjacent films can be made different by selecting different nanoparticles for each film. In general, the larger the difference in the RIs of the nanoparticles in each film, the larger is the difference in the RIs of the films. Processing conditions can also influence the RIs of the films, as will be discussed in more detail below.

In some embodiments of the invention, the filters of interest (e.g., 300 in FIG. 3) reflect at least 40%, or at least 50%, or at least 60%, or at least 70%, or at least 80%, or at least 90%, or at least 99%, of radiation of wavelength $\lambda_1$. In some embodiments, the filter reflects at least 40%, or at least 50%, or at least 60%, or at least 70%, or at least 80%, or at least 90%, or at least 99%, of radiation of n-multiple wavelengths $\lambda_1$, $\lambda_2$, $\lambda_3$ ..., $\lambda_n$. The wavelengths $\lambda_2$, $\lambda_3$ ..., $\lambda_n$ can be selected for the ultraviolet, visible, or other portions of the EM spectrum. In some embodiments, $\lambda_2$, $\lambda_3$ ..., $\lambda_n$ are selected to improve the aesthetics of the filter, such as by filtering for a desirable color) or to provide UV stability of an object behind the filter. There can be multiple harmonics to a particular reflection, so it is possible to have multiple narrow reflection bands. In some embodiments, the filter reflects a band of wavelengths surrounding $\lambda_1$, maintaining a full width half maximum (FWHM) of at least 50 nm, or at least 100 nm, or at least 150 nm, or at least 200 nm, or at least 250 nm, or at least 300 nm, or at least 350 nm.

In some embodiments, the films forming the filters of interest are formed using a layer-by-layer assembly technology. Layer-by-Layer (LbL) processes build films by making use of charge-charge (i.e. ionic or electrostatic), hydrogen bonding, or other complementary interactions to assemble successive layers into a film. This typically involves the use of solvents to ionize molecules or support hydrogen donation and acceptance in the deposition solutions. In some embodiments alcohols, glycols, and other organic solvents are used. In other embodiments water is used. In some embodiments, combinations of solvents are used.

In general, LbL deposition is achieved by applying a solution that includes polyelectrolyte backbone molecules to which a wide variety of desired functional groups are attached. In some embodiments embodiment of the invention, water is used as the solvent, nanoparticles of materials with desirable RIs are attached to the backbone molecules, and the films are applied using a spray LbL technique. Further information about this film-deposition technique can be found in co-pending U.S. Provisional Patent Application Ser. No. 61/702,112, filed Sep. 17, 2012, which application is incorporated herein by reference for the description of such film-deposition techniques.

For example, in some embodiments, LbL deposition is carried out by spray application of at least two deposition solutions. In one deposition solution is contained a polyelectrolyte such as a polymer material dissolved in a solvent. In the other deposition solution is contained a polyelectrolyte such as nanoparticles dissolved or dispersed in a solvent. Multiple spray applications are made in alternating fashion in order to build up the layers of the film. Adjacent layers contain opposite charges (or another binding pair such as complementary hydrogen bonding groups) such that the layers bind to each other to create a stable film. Each pair of layers containing complementary binding materials is referred to herein as a "bilayer."

In some embodiments materials used to make films have functionalities that providing complementary binding interactions, such as electrostatic binding, hydrogen bonding, Van der Waals interactions, hydrophobic interactions, and/or substrate-ligand binding. In one arrangement, and within an individual bilayer there can be two solutions used to make the layer. One solution comprises functionality that affects a first charge and the other solution has a functionality that affects a second charge opposite to the first charge.

In some embodiments, films formed using spray LbL are made to be porous. Depending on the choice of deposition parameters, the porosity can range from about 0%, with essentially no pores, to nearly 75%, where a substantial volume fraction of the film is open space. The RI of a film decreases with increased porosity, making it possible to tune the RIs of each film for desirable properties, such as a maximum difference in refractive indices, by adjusting the porosities of the films, as well as by choice of materials (e.g. metal oxide nanoparticles) in the films. Thus, using LbL to form films for dichroic mirrors is especially useful, particularly when a wide difference between the RIs of adjacent films is desirable. The larger the RI difference between the films, the broader the range of wavelengths that are reflected (see Equation 2). Furthermore, as illustrated by equation 2, for a given difference in RIs of adjacent films, a lower RI value for both components results in a larger $\Delta\lambda$, leading to better performing solar control. Table I shows examples of some effective RIs that have been achieved in a variety of polymer-containing films.

As discussed above, LbL films can include a wide variety of functional groups. In some embodiments, materials used for bilayers within films in dichroic mirrors can include additional functional groups beyond those used to effect the desired RI differences. Such additional groups can impart additional desirable properties. In one arrangement, electrically-conductive functional groups can be incorporated into a portion of the bilayers to make it conductive. In another arrangement, infrared (IR) absorbing groups can be incorporated into a portion of the bilayers or other components of the films of interest to improve solar heat gain coefficients. Examples of infrared absorbing groups include indium tin oxide (ITO) nanoparticles. For example, in some embodiments, ITO nanoparticles are embedded in a PVB laminate layer (e.g., a PVB laminate layer between a glass layer and a multilayer reflector film according to the disclosure, with an optional barrier layer between the PVB layer and the reflector film). The ITO nanoparticles can also be embedded within the multilayer reflector film, thereby imparting IR absorption properties to the film. Any of these configurations provide significant control over solar radiation, as the ITO nanoparticles provide absorption and the multilayer reflector provides reflectivity.

The use of porous films has the advantage that additional materials can be added to fill at least a portion of the pores of the films. In some embodiments of the invention, at least some of the film pores are filled with a material that can be crosslinked. In one arrangement, crosslinking can be achieved through subsequent thermal or ultraviolet processing. Crosslinking of material in the pores can improve adhesion of the film to the substrate and/or increase the mechanical integrity of the film. In some embodiments, materials with other desirable properties, such as thermochromic liquid crystals, photochromic liquid crystals, piezochromoics, solvachromics, or other responsive chromics can be loaded into the pores to add additional functionality to the film. Such additional materials can be added to the pores in each bilayer during processing, to each individual film as it is made, or to the final integrated stack once LbL deposition is complete. It will be appreciated that the incorporation of materials that enable response to environmental changes (temperature, intensity of daylight) is desirable for solar control films. For example, incorporation of photochromic dyes that tint (e.g. darken) a porous film is desirable when $T_{vis}$ can be sacrificed for lower SHGC.

In some embodiments, the filters described herein are prepared without the use of a high-temperature treatment step. For example, in some embodiments, the filters are prepared without the use of a calcination step, and no calcination is performed after the filters are prepared (e.g., prior to packaging or use of the filter). For example, in some embodiments, the filters are prepared by a process wherein the temperature of the surroundings and/or the temperature of the finished filter and/or the temperature of the mirror during the preparation process is maintained below the calcination temperature of the materials used in such preparation. For example, in some embodiments, the filters are maintained at a temperature below 200° C., or below 175° C., or below 150° C., or below 125° C., or below 100° C., or below 75° C., or below 50° C. during the entire preparation process.

As discussed above, the filters described herein (also referred to as "mirrors" or "mirror filters") can be designed to block any portion or portions of the EM spectrum through appropriate choice of materials and film thicknesses. In some embodiments, a mirror filter as described herein reflects wavelengths in the UV range. In some embodiments, a mirror filter as described herein reflects wavelengths in the IR range. In some embodiments, a mirror filter as described herein reflects wavelengths in the visible range. In some embodiments, a mirror filter as described herein reflects wavelengths in the range of 400 nm to 700 nm (i.e., visible range), or in the range of 700 nm to 1 mm (i.e., near IR, thermal IR, and far IR ranges), or in the range of 10 nm to 400 nm (i.e., UV range), or some combination thereof. In some embodiments, a multiple mirror filter reflects bands in both the IR and the ultraviolet (UV) ranges. In some embodiments, a multiple mirror filter reflects bands in the visible and some other EM range. Such reflections as just described include complete reflection (i.e., 100% reflection) and also include less than complete reflection, such as greater than or equal to 99, 98, 95, 90, 85, 80, 75, 60, 50, or 40%.

In some embodiments, the filters described herein are not reflective of EM radiation commonly used for communication and positioning devices such as cellular telephones, radios, and GPS devices. For example, the filters are not reflective of EM radiation having microwave wavelengths or greater than microwave wavelengths. In some embodiments, the filters are not reflective of EM radiation having wavelengths greater than about 1 mm, or greater than about 1 cm, or greater than about 10 cm, or greater than about 1 m, or greater than 10 m. In some embodiments, the filters are not reflective of wavelengths between about 1 mm and 10 m, or between about 1 cm and 10 m. In some embodiments, the filters do not reflect wavelengths between about 100 mm and 250 mm. In such wavelength ranges described above, the filters described herein are non-reflective, meaning that they reflect equal to or less than 50, 40, 30, 20, 15, 10, 5, 3, 1, 0.5, or 0.1% of incident energy. In some embodiments, greater than or equal to 60% of incident communications and/or GPS signals are transmitted through the filters of interest, or greater than or equal to 70, 80, 90, 95, 98, 99, or 99.9%.

In some embodiments, the filters provided herein permit a desired amount of energy transmission for frequencies <1 THz. In some such embodiments, such desired amounts is greater than 10%, or greater than 25%, or greater than 50%, or greater than 75%, or greater than 90%, or greater than 95%, or greater than 99%.

In some embodiments, the filters prepared according to the disclosure have, for a given $T_{vis}$, a value of $T_{ser}$ (i.e., total solar energy rejection, which is equivalent to 1 minus the SHGC) that is greater than $74.7-0.3098*T_{vis}$ and a value of $A_{sol}$ that is less than 10%, or less than 5%, or less than 2%, or less than 1%. Such given $T_{vis}$ can be any value between 20% and 100%, such as 20%, or 30%, or 40%, or 50%, or 60%, or 70%, or 75%, or 80%, or 90%, or 95%, or 98%, or 99%, or 100%.

In some embodiments, the filters prepared according to the disclosure provide $T_{ser}>74.7-0.3098*T_{vis}$ and $A_{sol}<62.5-0.25*T_{vis}$.

In some embodiments, the filters of interest are not prepared from co-extruded polymers. In some embodiments, the filters are not prepared from a plurality of neutral (i.e., uncharged, or non-polyelectrolyte) polymers.

In some embodiments, the disclosure provides articles comprising any of the filters described herein.

In some embodiments, films are prepared using the methods described herein that have narrow bandpass characteristics. That is, the films allow a narrow band of desired frequencies to pass, while still maintaining solar control as described herein. For example, in some embodiments, the filters filter IR frequencies but allow passage of a band of wavelengths centered within the communication bands described herein (e.g., microwave wavelengths). In this context, by a "narrow band" is meant a band of wavelengths centered around $\lambda_0$ (where $\lambda_0$ is, for example, in the microwave range) and having a width at half maximum of, for example, less than 50 nm, or less than 100 nm, or less than 200 nm, or less than 300 nm, or less than 400 nm, or less than 500 nm.

It will be appreciated that film architectures other than those specifically described herein but known in the art are also suitable for use with the reflecting bandpass filters described herein. That is, the dichroic filter architecture described throughout this application is for the purpose of illustration only, and is not intended to be limiting. Multiple Bragg stack films, Fabry Perot etalons, etc. are also suitable to incorporate the reflecting bandpass filters comprising polyelectrolytes as described herein.

In an embodiment, a filter is an integrated stack filter that is integrated into a laminated glass assembly. Specifically, a integrated stack is disposed between two laminating layers. The laminating layers act to laminate a pair of glass layers. The order of the layers is thus glass, laminating, integrated stack, laminating, and glass. Materials suitable for the laminating layers include adhesive materials such as, for example, polyvinyl butyral (PVB), polyacrylates, polymethyl methacrylates, vinyl acetates, polyvinyl alcohol, and the like. In some such embodiments, the integrated stack filter is integrated into a laminated glass assembly with IR absorbing materials in the laminating material and/or the glass material.

In some embodiments, the integrated stack filter is integrated into an insulated glass unit, as a suspended film. For example, insulating window glass is commonly prepared using a two-pane structure. A layer of polymer film (e.g., PVB or PET) can be sandwiched (i.e., suspended) between two glass panes in order to increase insulating properties further. Using the methods described herein, an IR-filter can be disposed upon the suspended polymer film. In such embodiments, the suspended polymer layer provides both insulation and IR-reflection, which can provide for increased functionality of the glass structure.

In an embodiment, a integrated stack filter according to the disclosure can integrated into a glass laminate structure to provide a filtering composite. Such a configuration can be used, for example, with safety glass in automobile or other windows. Such a configuration provides a glass structure with an ability to control the wavelengths of EM radiation that pass or are blocked from passing. In some embodiments, the control provided by such a configuration allows higher performance automobile safety glass (providing, for example, a more comfortable environment within the automobile while not blocking cellular and GPS signals), a lower cost production system (lower processing and/or lower material costs), and/or improved flexibility in design. In some embodiments, the glass laminate structure reflects rather than absorbs certain wavelengths. For example, in some embodiments the laminate structure reflects at least 50%, or at least 60%, or at least 70%, or at least 80%, or at least 90%, or at least 95%, or at least 98% of incident IR radiation (e.g., incident radiation having wavelengths between 700 nm and 1 mm, or between 740 nm and 8 µm).

For example, a structure is provided that is a glass window composite comprising the following layers in order: a first glass, a first laminating material (e.g., PVB), a integrated stack according to the disclosure, a second laminating material (e.g., PVB optionally containing an IR or other EM absorbing material), and a second glass (also optionally containing and IR or other EM absorbing material). In practice, such a structure could be mounted with the first glass layer exposed to solar radiation (e.g., as the window of an automobile, oriented such that the first glass layer is positioned on the outside of the automobile). Solar radiation that encounters such a structure behaves as follows. Some visible light and IR radiation reflects off of the air/glass interface for the first glass layer. Of the radiation that passes through the first glass layer, all or a substantial amount of IR radiation is reflected when it reaches the integrated stack layer. Of the remaining radiation, some visible and IR radiation (if any IR radiation remains) reflects at the air/glass interface of the second glass layer. Furthermore, additional IR radiation is absorbed by the absorbing material present in the second laminating and second glass layers. Based on this process, all or a substantial amount (e.g., >60%, or >70%, or >80%, or >90%, or >95%, or >99%) of IR radiation is reflected or absorbed, while most visible radiation and GPS, cellular, and other communication wavelengths (e.g., >60%, or >70%, or >80%, or >90%, or >95%, or >99%) pass through the structure.

As demonstrated by the example just described, in some embodiments the composites of interest provide solar control via a combination of reflection and absorption. For example, in some embodiments the composites provide reflection via a integrated stack as described herein and absorption via absorbing materials located in a laminating layer and/or in a substrate. In some embodiments, to minimize heat transfer and heat buildup, more IR from solar radiation is reflected compared with the amount of IR that is absorbed. For example, in some embodiments, the ratio of reflection ($R_{ds}$) to absorption ($A_{sol}$) for a composite of interest is greater than or equal to 0.1, 0.3, 0.5, 0.7, 0.9, 1.0, 2, 3, 5, 7, 10, 15, 20, 25, 30, or 40.

In some embodiments, the integrated stack filter according to the disclosure is integrated into an adhesive film. Such configurations are useful, for example, in after market applications (i.e., self-adhesive films that can be purchased and applied to substrates already in the market). In some such embodiments, such films are single ply films (i.e., not double-ply, laminated films), and therefore exhibit one or more of the following benefits: less material and fewer processing steps, thinner material, easier installation (particularly on curved surfaces), faster drying, better optics, and overall lower cost. In some embodiments, the integrated stack comprises the following layers in order: glass, mounting adhesive, integrated stack, and optional hard coat base. Various adhesive materials (as described herein for laminating layers) can be employed in the mounting adhesive layer. The integrated stack layer is disposed on mounting adhesive and is, in some embodiments, an integrated stack filter according to the disclosure. In some embodiments, the hard coat base comprises multiple layers, such as first hard coat layer and second hard coat layer. Materials suitable for the hard coat layer include, for example, polymeric materials such as polyacrylates, polymethacrylates and polysiloxanes. In some embodiments, a solar control film is mounted on a glass substrate and the solar control film comprises mounting adhesive, integrated stack, and optional hard coat base.

In some embodiments, the integrated stack filter is integrated into a clear coat to provide thermal management functionality. In some embodiments, the integrated stack filter is delaminated, converted into optical film particles and dispersed into a clear coat. For details on this procedure see co-pending application U.S. provisional application Ser. No. 61/702,121, filed Sep. 17, 2012, the disclosure of which is incorporated herein by reference.

EXAMPLES

The following examples are representative only, and are not meant to be limiting.

Example 1

Preparing Solutions for PSS Based Films

A solution of poly sodium-4-styrene sulfonate (PSS) was prepared by dissolving 4.1 g of PSS (average MW of 70,000, purchased from Sigma-Aldrich) per liter of deionized water. The pH of the solution was adjusted to 4.0, with sodium hydroxide and hydrochloric acid.

Cationic silica nanoparticles (STAKML) were purchased from Nissan Chemical of America. The nanoparticles were diluted to a concentration of 10 g/L using deionized water. Sodium chloride was added to the solution to a final concentration of 50 mM.

Cationic titania nanoparticles (NA7012R) were purchased from Nanoamor. The nanoparticles were diluted to a concentration of 10 g/L using deionized water. Sodium chloride was added to the solution to a final concentration of 100 mM.

The rinse solution was formulated by adding hydrochloric acid to deionized water to achieve a pH of 4.0

Preparing Solutions for PDAC Based Films

A solution of polydiallyldimethyl ammonium chloride (PDAC) was prepared by adding 16.17 grams of 100-200 k MW 20 wt % solution (Sigma Aldrich) to one liter of deionized water. Tetramethyl ammonium hydroxide (TMAOH, Sigma Aldrich) was added to the solution until a pH of 10.0 was achieved Anionic silica nanoparticles (Ludox AS40) were purchased from Sigma Aldrich. 9.2 grams of tetraethylammoniumchloride (TEACL, Sigma Aldrich) were added to one liter of deionized water and mixed until thoroughly dissolved. 25 grams of the nanoparticle suspension were then added to suspension slowly.

Anionic titania nanoparticles were synthesized using a hydrothermal synthesis of titania nanoparticles suspended in deionized water (SvTiO2). To synthesize SvTiO2, the following materials were used. Six times 142.4 g Titanium (IV) isopropoxide (TTIP, Sigma-Aldrich). Six times 9.92 g Tetramethylammonium hydroxide (TMAOH, Sigma-Aldrich, 25% wt solution). Tetraethyl orthosilicate (TEOS, Sigma-Aldrich) and aluminum isopropoxide (AIP, Sigma-Aldrich). Six times 4.00 kg deionized water. Extra DI-$H_2O$, Six Cuisinart pressure cookers with Teflon pots. Six stir bars (about 4 cm long and 0.8 cm wide). 250 mL plastic cups. Several plastic pipettes (23 ml and 4 ml). Adjustable pipette for TEOS. Two stir plates placed in chemical hood. Scale for weighing TIP to 0.001 g accuracy placed in chemical hood. Scale for weighing TMAOH to 0.001 g accuracy. Scale for weighing water with minimum 10 kg capacity. Timer, nitrile gloves, oven mitts, Al-totes in buckets, funnel, overhead stirrer for mixing batch at the end. Big container for mixing pots into one batch at the end (capable of holding 24 kg of TiO2).

Procedure for preparing SvTiO2: Add 50 g+/−1 g of DI-$H_2O$ to a 250 mL plastic cup. Add 9.92 g of TMAOH to the cup. In parallel, add about 3.7 kg of DI-$H_2O$ to a Teflon pot with stir bar. Pour the TMAOH into the Teflon pot and fill it with DI-$H_2O$ to 4.00 kg. Repeat the foregoing steps with the remaining 5 Teflon pots. Bring the first two pots onto stir plates and stir at 800 rpm. Add 142.4 g of TIP to a 250 mL plastic cup. Slowly (over about 1 minute) pour the TIP out of the plastic cup on the border of the vortex. Pipette TEOS in desired weight fractions, (e.g., 0.9 g TEOS provides 0.5% wt %, 1.8 g TEOS provides 1 wt %, and 3.6 g TEOS provides 2 wt %) in two steps, into the Teflon pot. Stir the solution for about 4.5 minutes. Repeat the foregoing steps with the remaining 5 Teflon pot. Insert each Teflon pot into its pressure cooker, close the lid, and set the timer for 90 minutes on 'high pressure'. Start the pressure cooker with the top vent open. After 45 minutes close all open vents. After 90 minutes the pressure cookers will stop heating. Open the valves to depressurize. Restart the pressure cookers for another 90 minutes on 'high pressure' with the valves closed. After 90 minutes the pressure cooker will stop heating. Open the valves to depressurize. Open the lids of the pressure cookers and use the oven mitts to remove the hot $TiO_2$ solutions. Pour all six $TiO_2$ solutions into the big container and add DI-$H_2O$ to 24.00 kg. Stir the $TiO_2$ solution with an overhead stirrer for about 10 minutes.

7.1 grams of tetramethylammoniumchloride (TMACL, Sigma Aldrich) was thoroughly dissolved in 10 milliliters of deionized water and then added dropwise to one liter of the $SvTiO_2$ suspension and mixed.

A rinse solution was prepared by adding TMAOH to deionized water to a final pH of 10.0.

Example 2

Deposition of Solutions

2"×2" borosilicate glass (obtained from McMaster-Carr) was used as the substrates. A LbL spray deposition apparatus (modeled after the systems described in US Patent Application Publication No. US 2010/0003499 to Krogman et al., as well as Krogman et al., *Automated Process for Improved Uniformity and Versatility of Layer-by-Layer Deposition, Langmuir* 2007, 23, 3137-3141) was used to apply solutions directly to substrates. A deposition solution consisting of polymer, titania and silica (4 s spray time) was alternated with rinse (10 s spray time) applied in between. 50 bilayers of (PSS/NA7012R), (PSS/STAKML), (PDAC/AS40) and (PDAC/SvTiO2) were deposited for the determination of optical thicknesses and refractive indices.

7-film quarter wave (QWOT) stacks (based on the PSS and PDAC) were designed with a $\lambda_0$=880 nm specified. Each stack was created using high index films 1, 3, 5 and 7 (where film 1 is closest to the substrate and film 7 is furthest from the substrate) and low index films 2, 4 and 6. For the low index films, either (PSS/STAKML) or (PDAC/AS40) were used. For the high index films, either (PSS/NA7012R) or (PDAC/$SvTiO_2$) were used.

In each case, several bilayers are required to create a film with the appropriate quarter wavelength thickness. For example, it took 20 bilayers of (PSS/NA7012R) to make a high index film of appropriate thickness and 12 bilayers of (PSS/STAKML) to make a low index film of appropriate thickness.

Coupled Bragg Reflectors (CBR) based on (PDAC/SvTiO2) and (PDAC/AS40) were prepared to create broadband solar control architectures. For example, a representative stack design includes a 6-film QWOT stack with $\lambda_1$=860 nm and a second 5-film QWOT stack with $\lambda_1$=1182.5 nm (e.g. ⅜ WOT higher in the IR region) and an intermediate layer of the low-index film (e.g. PDAC/AS40), and resulted in $\lambda_1$=1021.25 (e.g. the average of the two adjoining mean wavelengths). This CBR architecture resulted in a device capable of blocking a wider portion of spectrum (e.g. data discussed in Example 3).

Example 3

Film Properties and Measurement

The reflectance measurements are converted into an optical thickness and refractive index using the optical fitting software TFCalc (Software Spectra).

Figure 1B:
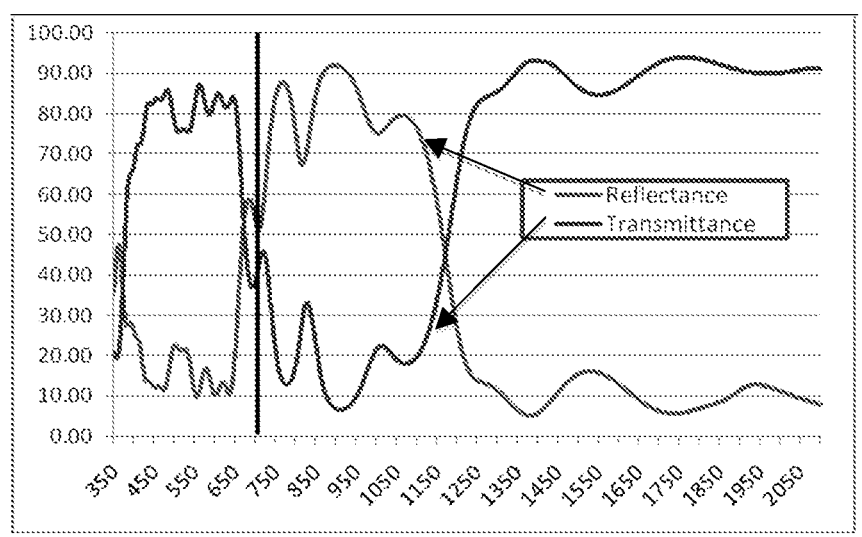
Figure 2:
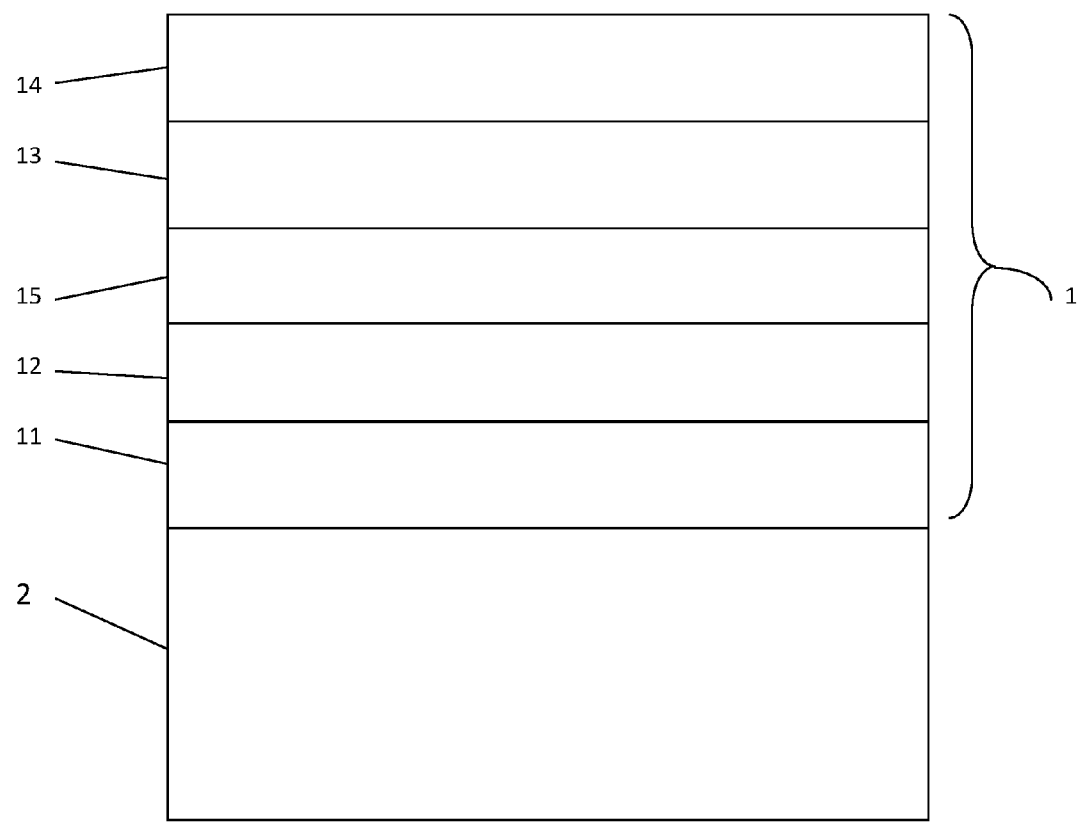
FIG. 2 shows a filter 1 comprising.

Optical reflection and transmission spectra for a PDAC based QWOT and a PDAC based CBR, are measured using a Shimadzu 3101, with the data shown in FIGS. 1(a) and 1(b). Both transmission spectra exhibit a strong reflection in the wavelengths between 700-1000 nm, indicating strong blocking (reflecting) of near infrared radiation while allowing substantial transmission (e.g., greater than or equal to 70%, 75%, 80, 85, 90) in the visible portion of the spectrum (400-700 nm) and at longer wavelengths (>2000 nm). The near perfect inverted correspondence between the transmission and reflection data indicates very little absorbance for wavelength ranges between 350-2000 nm (as absorbance=100% minus the summation of % Reflection and % Transmission).

The difference between the two data sets in FIGS. 1(a) and 1(b) is the difference between a straight QWOT design and a CBR, with an example of both being described in Example 2. The transmission spectrum for a 7-layer QWOT design in FIG. 1(a) indicates that the integrated stack can be used to block substantial quantities of near infrared radiation. The transmission spectrum for a more complex 12-layer CBR design in FIG. 1(b), indicates that the integrated stack can be used to block a wider portion of the spectrum, resulting in higher performance solar heat gain coefficients. Both of these stacks are based on the PDAC/SvTiO$_2$ and PDAC/AS40 chemistries, which illustrates the importance of the refractive index spreads (shown in Table 1). Compared with data obtained from PSS/NA7012R data (not shown), whose total spread in refractive index is about 0.48, the PDAC/SvTiO2 system, with a total spread in refractive index of about 0.62, exhibits lower transmission (at $\lambda_1$) and a wider full width at half max for infrared reflectivity. For the same number of films in each stack, the PDAC/SvTiO2 systems exhibit superior solar control, by blocking a larger flux of infrared photons.

Example 4

Laminated Film Having a Filter Component

The broadband IR filters described herein can be integrated into safety windshields, insulated glass units, or multilayer composite films via lamination or other packaging processes. Two devices were designed and prepared according to the invention, with the following layers (in order): glass, laminating material, integrated stack, laminating material. The laminating layers were prepared from polyvinyl butyral (PVB) with a thickness of 0.38 mm. The glass layer was annealed glass of 2.3 mm in thickness. The device incorporated an integrated broadband IR filter, a PVB layer without IR absorbers, a PVB layer with IR absorbers, and a glass layer with IR absorbers. The device is suitable (for example) for applying to the inside of a car window or dwelling window. Solar radiation is transmitted through the outer glass layer, and is mostly reflected by the IR Filter. Most of the non-reflected IR radiation is then absorbed by the laminating and glass layers containing IR absorbers. The result is solar control with a majority of IR radiation being reflected, while relatively little energy is absorbed. The absorbing/reflecting combination provides a product that prevents penetration of IR radiation through the composite structure, and further prevents additional reirradiation into the cabin by reducing the amount absorbed.

An integrated stack was prepared to investigate solar control properties of the laminated film described above. The film contained the following layers: (PDAC/SvTiO$_2$)$_{10}$-[(PDAC/SiO$_2$)$_{12}$(PDAC/SvTiO$_2$)$_{10}$]$_3$-(PDAC/SiO$_2$)$_{14}$-(PDAC/SvTiO$_2$)$_{14}$[(PDAC/SiO$_2$)$_{17}$(PDAC/SvTiO$_2$)$_{14}$]. UV-Vis transmittance data was obtained for this integrated stack (not shown) and compared with corresponding simulation results (using TFCalc), indicating good correspondence throughout the wavelengths of interest. Using transmittance data and ISO13837-2008 standard for window glazing, visible light transmission (T$_{vis}$) was found to be 82.4%. Reflectance in the visible region (R$_{vis}$) was measured to be 16.6%. Absorbance in the visible region (A$_{vis}$) was found to be 1.0%. R$_{ds}$ (Solar direct reflectance) and A$_{sol}$ (Absorption of solar radiation) were determined to be 41.9% and 0.9%, respectively. The solar heat gain coefficient (SHGC) was calculated to be 0.58.

Example 5

Filtering Properties of the Laminated Film

An IR absorbing windshield structure was fabricated by laminating a piece of 2.3 mm glass with 2.3 mm IR absorbing glass using 0.76 mm thick IR absorbing PVB. The UV-Vis spectrum was obtained (not shown) and converted into solar control metrics. The resulting properties included T$_{vis}$=72.3%, R$_{vis}$=6.5%, A$_{vis}$=21.2%, R$_{ds}$=4.0%, A$_{sol}$=56.1% and SHGC=0.54. A laminated structure including the integrated IR reflecting stack was fabricated by laminating, in order, 2.3 mm of glass, 0.38 mm of PVB, integrated stack, 0.38 mm of IR absorbing PVB and 2.3 mm of IR absorbing glass. The UV-Vis spectrum was obtained (not shown) and converted into solar control metrics. The resulting properties included T$_{vis}$=77.9%, R$_{vis}$=8.8%, A$_{vis}$=13.3%, R$_{ds}$=31.8%, A$_{sol}$=31.6% and SHGC=0.45. The latter demonstrates higher visible transmission (T$_{vis}$), lower solar absorbance (A$_{sol}$), higher direct solar reflectance (R$_{ds}$) and lower SHGC. These features demonstrate superior visible and solar thermal management performance. The combination of absorbing and reflective technology yields a superior properties over either alone.

Example 6

Alternative Laminated Film Assembly for Integrated Solar Control Window

An alternative solar control film is provided containing the following layers: glass (or another substrate for desired solar control); adhesive; and substrate (e.g. PET). The broadband IR filter contains a hardcoat that protects the IR filter. An integrated assembly can also be provided as a similar article only without the substrate.

Example 7

Effective Refractive Index for Composite Films

Films were prepared according to the procedure above and using the materials shown in Table 1. Refractive indices were measured and are provided in Table 1.

TABLE 1

| Representative Material Sets | Nanoparticles | Effective RI |
|---|---|---|
| (PDAC/AS40) | $SiO_2$ | 1.26-1.30 |
| (PSS/STAKML) | $SiO_2$ | 1.24-1.30 |
| (PSS/NA7012) | $TiO_2$ | 1.85-1.94 |
| (PDAC/SvTiO$_2$) | $TiO_2$ | 2.01-2.10 |

Key
PDAC polydiallyldimethyl ammonium chloride
PSS poly sodium-4-styrene sulfonate
AS40 anionic silica nanoparticles: 22 nm (average diameter)
NA7012 cationic titania nanoparticles
SvTiO2 anionic titania nanoparticles Example 8

Comparison to Commercial Film

A commercial multilayer silver based solar control film such as V-KOOL75 (V-KOOL USA) exhibited Tvis of 75% and a SHGC of 0.55 (for greater solar control, higher Tvis and lower SHGC are preferred). A solar control film produced according to the disclosure provided herein resulted in higher performance characteristics: Tvis of 78% and a SHGC of 0.45.

We claim:

1. A filter comprising a first integrated stack and a second integrated stack planarly contacting the first integrated stack or planarly contacting an optional intermediate layer between the first and second integrated stacks,
   wherein the first integrated stack comprises:
   (a) a first film (A) comprising one or more of a first bilayer, wherein the first bilayer comprises a polyelectrolyte, and wherein the first film has a refractive index $n_A$; and
   (b) a second film (B) planarly contacting the first film (A) and comprising one or more of a second bilayer, wherein the second bilayer comprises a polyelectrolyte, and wherein the second film has a refractive index $n_B$ wherein:
   at least one of the polyelectrolyte of the first film (A) or the polyelectrolyte of the second film (B) comprises a polymer polyelectrolyte;
   $n_A$ and $n_B$ differ by at least 0.4;
   the filter selectively reflects electromagnetic radiation within a band of wavelengths around a selected wavelength
   wherein the second integrated stack selectively reflects electromagnetic radiation and comprises:
   (c) a third film (C) having a refractive index $n_C$; and
   (d) a fourth film (D) planarly contacting the third film and having a refractive index $n_D$, wherein:
   $n_C$ is greater than $n_D$ by at least 0.4;
   the second stack reflects electromagnetic radiation within a band of wavelengths around a selected wavelength $\lambda_2$; and the filter reflects electromagnetic radiation within a band of wavelengths around $(\lambda_1+\lambda_2)/2$.

2. The filter of claim 1, comprising a substrate planarly contacting the first integrated stack.

3. The filter of claim 1, wherein the polyelectrolyte of the first film is a polymer polyelectrolyte, and wherein the first bilayer further comprises nanoparticles.

4. The filter of claim 1, wherein the polyelectrolyte of the second film is a polymer polyelectrolyte, and wherein the second bilayer further comprises nanoparticles.

5. The filter of claim 1, wherein the band of wavelengths has a full width half maximum of at least 50 nm.

6. The filter of claim 1, wherein the first integrated stack is porous, and wherein the filter optionally comprises crosslinked materials in at least a portion of the pores.

7. The filter of claim 1, wherein the first integrated stack comprises a plurality of first films (A) and a plurality of second films (B), wherein each of the plurality of second films (B) is planarly contacting a first film (A) such that the first and second films are arranged in an alternating sequence.

8. The filter of claim 7, wherein the total number of first and second films in the first integrated stack is odd.

9. The filter of claim 1,
   wherein the filter further comprises a plurality of third films (C) and a plurality of fourth films (D), wherein each of the plurality of third films (C) is planarly contacting a fourth film (D) such that the third and fourth films are arranged in an alternating sequence.

10. The filter of claim 1,
   wherein the filter further comprises a plurality of third films (C) and a plurality of fourth films (D), wherein each of the plurality of third films (C) is planarly contacting a fourth film (D) such that the third and fourth films are arranged in an alternating sequence, and wherein the optical thickness of each of the third films (C) and each of the fourth films (D) is $\lambda_2/4$.

11. The filter of claim 1,
   wherein the optional intermediate layer is present and comprises a non-metal film (E) having a refractive index $n_E$ and a thickness equal to $(\lambda_1+\lambda_2)/8$.

12. The filter of claim 1, wherein the filter transmits >60% of signals selected from GPS, RF, cellular, and combinations thereof.

13. The filter of claim 2, wherein the polyelectrolyte of the first film is a polymer polyelectrolyte, and wherein the first bilayer further comprises nanoparticles.

14. The filter of claim 5, wherein the first integrated stack is porous, and the filter optionally comprises crosslinked materials in at least a portion of the pores.

15. The filter of claim 7, wherein the first integrated stack is porous, and wherein the filter optionally comprises crosslinked materials in at least a portion of the pores.

16. The filter of claim 7, wherein the band of wavelengths has a full width half maximum of at least 50 nm, wherein the polyelectrolyte of the first film is a polymer polyelectrolyte, and wherein the first bilayer further comprises nanoparticles, wherein the polyelectrolyte of the second film is a polymer polyelectrolyte, and wherein the second bilayer further comprises nanoparticles.

17. A method for forming the filter of claim 1, wherein the filter further comprises a substrate planarly contacting the first integrated stack, the method comprising the following steps:
   (a) depositing a first film (A) onto a substrate using a Layer-by-Layer (LbL) deposition method;
   (b) depositing a second film (B) onto the first film (A) using an LbL deposition method;
   (c) depositing a first film (A) onto the second film (B) from (b) using an LbL deposition method;
   (d) repeating steps (b) and (c) a plurality of times to form the first integrated stack; and
   (e) depositing the second integrated stack onto the first integrated stack.

18. The filter of claim 1, wherein the filter has a defined visible light transmission ($T_{vis}$) such that:

$T_{ser} > 74.7 - 0.3098 * T_{vis}$, and $A_{sol} < 10\%$;

wherein $T_{ser}$ is total solar energy rejection and $A_{sol}$ is solar absorbance.

\* \* \* \* \*